United States Patent [19]

McEwen

[11] Patent Number: 5,154,584

[45] Date of Patent: Oct. 13, 1992

[54] PUMP FOR FILTRATION SYSTEMS

[75] Inventor: Stephen N. McEwen, Bowling Green, Ohio

[73] Assignee: Henry Filters, Inc., Bowling Green, Ohio

[21] Appl. No.: 614,377

[22] Filed: Nov. 15, 1990

Related U.S. Application Data

[60] Division of Ser. No. 481,646, Feb. 12, 1990, which is a continuation of Ser. No. 144,058, Jan. 15, 1988.

[51] Int. Cl.$^5$ .................................. F04B 17/06
[52] U.S. Cl. ..................... 417/360; 417/423.3
[58] Field of Search ............. 417/360, 423.3, 423.9, 417/423.15, 424.1

[56] References Cited

U.S. PATENT DOCUMENTS

| | | | |
|---|---|---|---|
| 3,637,331 | 1/1972 | Smith et al. | 417/423.9 |
| 3,807,905 | 4/1974 | Pochyly | 417/360 |
| 3,880,553 | 4/1975 | Wolford et al. | 417/360 |
| 4,403,923 | 9/1983 | Korchin | 417/360 |

Primary Examiner—Richard A. Bertsch
Assistant Examiner—Charles Freay
Attorney, Agent, or Firm—Brooks & Kushman

[57] ABSTRACT

The pump includes a discharge head having a pair of axially spaced end walls defining in part an annular chamber therebetween. The tank includes a housing in communication with a liquid outlet conduit. By seating the discharge head in the tank housing, an annular pump discharge chamber is defined with the housing and between the end walls of the pump. Clean coolant from the suction side of a filter disposed in the tank flows through the pump inlet and discharge head into the tank outlet conduit for delivery to machine tools. The pump is driven through a releasable coupling by an electric motor disposed above the tank mounted for movement between operative and out-of-the-way positions whereby the pump may be readily removed from and reinstalled in the tank without disconnection or connection of pipe fittings within the tank. Alternatively, a submersible electric motor may be provided. In a further form, an electrically driven submersible pump connects the discharge outlet to the tank outlet conduit by a remotely controlled flexible coupling while making a slip-fit connection on the suction side.

36 Claims, 7 Drawing Sheets

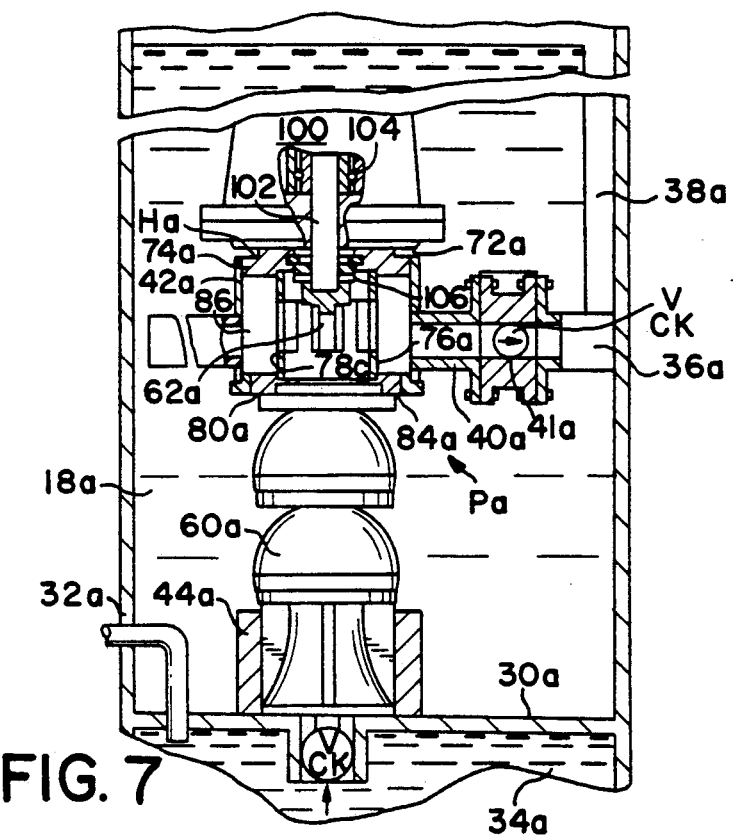
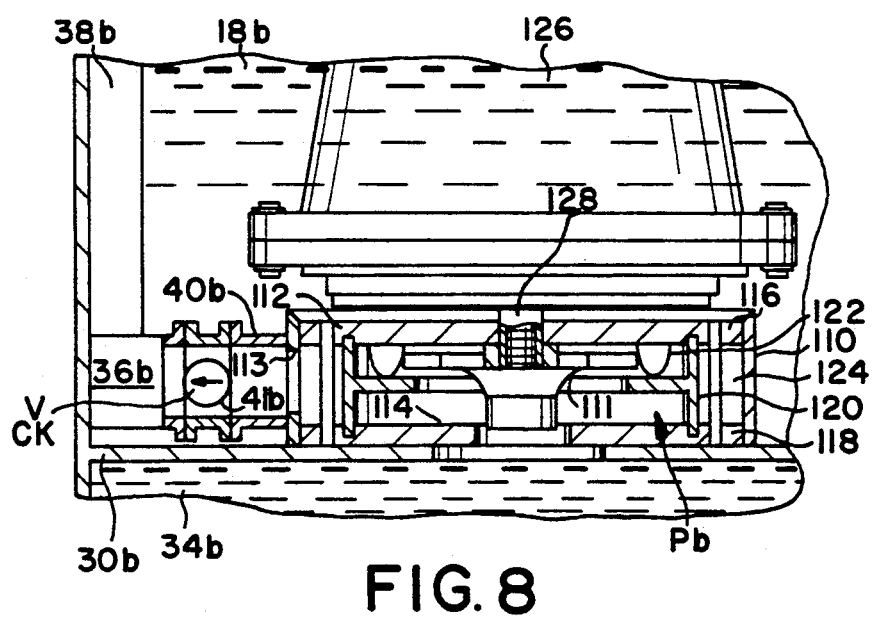
FIG. 7
FIG. 8

PUMP FOR FILTRATION SYSTEMS

This is a divisional of copending application Ser. No. 07/481,646, filed on Feb. 12, 1990 which is a file wrapper continuation of Ser. No. 144,058, filed Jan. 15, 1988.

BACKGROUND AND SUMMARY OF THE INVENTION

The present invention relates generally to filtration systems for use in industrial applications, such as cleaning machine tool coolant containing contaminants and machining chips and returning clean coolant to the machine tools for reuse, although the invention has aspects applicable to other uses, for example, for pumping various fluids, such as paint, chemicals, and the like. The present invention particularly relates to pumps and to apparatus and methods for mounting pumps used in such filtration systems to return clean coolant from a tank to machine tools such that the pumps are readily and easily removed from and reinstalled into the filtration tank for general maintenance purposes and to remedy specific pump problems.

In machine tool operations, settlement tanks containing filters are widely used to separate machine tool chips and other contaminants, referred to as swarf, from coolant so that clean coolant may be returned to the machine tools for reuse. Generally, such tanks are set below elevation such that sluiceways, likewise located below elevation, convey the contaminated liquid and machining chips to the settlement tank. The chips settle to the bottom of the tank and a dragout conveyor system is employed to convey the chips and swarf from the tank for removal, conventionally up a ramp located at one end of the tank. Filters are employed in the tank to separate the smaller chips and other contaminants from the coolant. While there are many different types of filters and arrangements thereof used for this purpose, one well known and commercially successful system manufactured and sold by the assignee hereof, Henry Filters, Inc., uses one or more horizontally disposed filter drums located adjacent the bottom of the tank. A suction is provided to the interior of the filter drum to pull coolant through the filter element. Filter cake, comprised of small chips and other contaminants, is thus formed on the outside of the drum surface. The drum is periodically indexed to enable a doctor blade to shave off a portion of the accumulated filter cake, which drops to the bottom of the tank for removal by the dragout conveyor.

In the example of a filtration system discussed above, a clean coolant tank is also provided in the tank for receiving the clean coolant filtrate. Although many types of centrifugal pumps are used, such as horizontal split case, end suction, and self-priming types, one embodiment of such a filtration system uses one or more vertical turbine-type pumps. These pumps are disposed in the clean coolant tank for applying suction to the interior of the filter drum(s), as well as for supplying clean coolant to a header for return to the machine tools. More particularly, these vertical turbine pumps each typically comprise an elongated casing connected at its lower end with one or more impeller stage(s) for pumping clean coolant filtrate upwardly through the elongated casing. The impeller stages of each pump are driven by an electric motor mounted at the top of the casing above the liquid level in the tank. The motor drives the impellers by a central drive shaft which extends the length of the casing through multiple bearing assemblies supported by the casing. The lower end of the pump is received in a receptor ring located to enable the pump suction to connect through a suction chamber to the interior of the filter drum(s). The outlet for each vertical turbine pump is located above the coolant level of the filtration tank and above the tank itself and is connected to a header into which the clean coolant is discharged for return to the machine tools. Such arrangement is generally described and illustrated in assignee's U.S. Pat. No. 4,507,061, issued Mar. 26, 1985.

From time to time, one or more of these elongated vertical turbine pumps must be removed from the tank for maintenance, including cleaning and/or replacement of bearings and seals as needed, and thereafter reinstalled. This has required disconnection of mechanical piping connections, such as by unbolting, between the pump and header as well an electrical disconnection of the electric pump motor. As will be appreciated, this involves considerable labor and expense. It also involves imposing on the user of the system requirements which greatly add tot he cost of the installation. For example, in certain installations, each vertical turbine pump may have a height of 20 feet or more. To remove such pump from an operating position in a tank below working level, sufficient headroom above the filtration tank must be provided to accommodate the entire height of the pump. For example, to enable a vertical turbine pump having a length of 20 feet or more to be lifted substantially vertically from the filtration tank requires headroom above the tank of approximately a like extent. It will be appreciated that these pumps are quite heavy and require for their removal use of an overhead crane or other lifting mechanism. In many installations, there is just simply insufficient headroom or access space above the tank to enable ready and easy removal and reinstallation of the pump.

Moreover, to remove such vertical turbine pump from an installation and reinstall it, the services of at least three skilled tradesmen are required, a millwright, an electrician and a pipefitter. Particularly, to effect removal, the electric motor must be disconnected, the bolted connections between the pump discharge and header must be removed, and valves must be closed to isolate the suction and discharge sides of the pump. Thereafter, the elongated heavy vertical turbine pump must be lifted from the tank without damaging it or adjacent ancillary equipment. Additionally, these vertical turbine pumps are quite expensive to manufacture and are usually custom-built to meet individual application needs. They also require lubrication, which frequently necessitates use of costly automatic lubricators, and customarily have multiple bearings and other ancillary equipment necessary to support their elongated drive shafts. Further, the motors require cooling and lubrication and produce substantial noise. As will be appreciated, it is desirable to eliminate or minimize noise levels as well as to eliminate the requirement for lubrication because periodic greasing requires substantial labor and adherence to maintenance schedules. Automatic greasing equipment, as required in some installations, substantially increases the cost of such installation. Still further, the entire area above the tank is typically misty from the coolant and moist air, driven by the motor fan for cooling purposes, and such moist air inherently dirties the electric motors, thereby increasing the probability of their malfunction. Thus, there has been a need in the industry to provide pumps which may be readily and easily removed and reinstalled in filtration tanks of this type without the foregoing and other attendant problems.

In an effort to solve some of these installation and attendant problems of this type of pump, assignee hereof installed in a commercial installation a conventional end suction centrifugal submersible pump modified at its suction inlet to provide a positive suction connection through a receptor ring with the suction side of a filtration drum. The discharge was connected by vertical piping fixed to the submersible pump to a header located above the coolant tank. In this installation, it is necessary, when removing the pump, to concurrently remove the entirety of the vertical discharge pipe extending from the pump discharge to adjacent the header above the coolant tank. This requires the same type of piping disconnection as previously indicated with respect to vertical turbine-type pumps. While that installation has proven satisfactory and solved certain problems, others remain, for example, the need to disconnect the discharge piping from the header and the need for adequate headroom necessary to lift the submersible pump, including its discharge piping, from the coolant tank.

According to the present invention, there is provided novel and improved pumps and related mounting apparatus for use, for example, in the settlement tanks of industrial machine tool coolant filtration systems, as well as methods for the installation and removal of the pumps. As will be appreciated, such settlement tanks preferably include a dirty coolant tank compartment in which one or more filters and a dragout conveyor are disposed. A clean coolant tank compartment is also preferably provided in the tank to facilitate continuous pumping of clean coolant to the machine tools while the filter or portion thereof is cleaned as explained in detail hereinafter. Certain installations may, however, have only a dirty coolant tank compartment. More particularly, the present invention provides pumps for use preferably in the clean coolant tank compartment (although such pumps may likewise be used in the dirty coolant compartment) and which pumps may be readily and easily removed from and reinstalled in the coolant tank without draining the tank, disconnecting or reconnecting pipe couplings, joints and electrical connections, or manually closing valves, and without the need for substantial headroom or overhead access space. Moreover, the pumps hereof are disposed at the lowest point in the compartment to reduce the vertical lift of the coolant from the tank to the pump, and in certain embodiments hereof, to enable use of standard foot-mounted electrical motors rather than special vertical turbine motors, afford easy maintenance, minimize or eliminate the need for lubrication, eliminate numerous wear points and operating noise, minimize the number of bearings and areas for failure and minimize the number of skilled tradesmen involved in removing and installing the pumps.

In a preferred embodiment of the present invention, there is provided a pump having an axial inlet or suction port at its lower end adjacent the pump impeller stage or stages and a pump discharge head adjacent the upper end of the pump having an integral conduit defining a pump outlet port or ports. The pump discharge head includes a pair of axially spaced end walls defining a chamber for receiving coolant flowing upwardly from the impeller through these outlet ports. The clean coolant tank compartment has a false bottom defining an underlying chamber in communication with the suction side of the filter. A suction or inlet receptor is mounted on the false bottom for receiving the lower suction port of the pump and placing it in communication with filtered coolant on the suction side of the filter drum. Above the suction or inlet receptor, there is provided a housing or discharge receptor which receives the discharge head of the pump. The receptor is structurally supported by the tank.

More particularly, when the pump is in the operative position in the tank, its suction port is received in the suction receptor, placing it in communication with the suction side of the filter drum. The discharge receptor preferably comprises an annular ring which forms, with the end walls of the pump discharge head and the internal conduit, an annular chamber for receiving the pressurized coolant pumped upwardly by the impeller(s). An outlet conduit having a check valve is fixed in and to the tank at a location below the coolant level in the tank and communicates the pressurized coolant between the annular chamber and a header.

In this form of the present invention, the drive for the pump is provided by an electric motor mounted above the tank for movement between operative and out-of-the-way positions. The motor drive shaft is coupled to an elongated shaft which carries the pump. Preferably, an axial thrust bearing, for example, a Kingsbury bearing, supplied with coolant, is disposed adjacent the upper end of the pump discharge head such that the axial downward thrust caused by the pumping action is carried by the discharge receptor. Consequently, the drive shaft for the pump may simply carry torque loading rather than tension stresses. This permits use of a torque coupling only, such as a spline connection, rather than a coupling which transmits both torque and tension. The electric motor drive shaft is therefore readily removable from the drive shaft for the pump.

Typically, a plurality of pumps are provided the tank, the other pumps of the system being similarly constructed. In operation, the pumps draw filtrate, i.e., clean coolant, from the filter(s) through the lower axial suction ports of the pumps. The filtrate is pumped into the chambers defined between the end walls of the pump discharge heads and the discharge receptors for transmission through the outlet conduits past the check valves to the header.

To facilitate removal of a pump from the tank and its installation into the tank, the pump is provided with lateral guides which engage guideways carried by the tank. These guideways center the pump to ensure that the pump is properly aligned with the discharge and suction receptors.

When it is desired to remove the pump of this embodiment of the invention from the tank, the drive shaft of the electric motor, located above the tank, is disconnected from the pump shaft. The electric motor is then pivoted into an out-of-the-way position. The pump may then be lifted vertically from the tank by an overhead crane or other lifting mechanism without further piping disconnection. When the pump is lifted, the suction port is withdrawn vertically from its suction receptor and both the pump discharge head and impeller stages are withdrawn vertically through the discharge receptor for removal from the tank. The check valve in the outlet conduit automatically closes to prevent communication between pressurized coolant in the header and the coolant in the tank. In multiple pump installations, a check valve is also carried by the suction receptor to prevent loss of suction pressure on the filter by the other pump(s) when one pump is being removed. This latter check valve also automatically closes upon removal of the pump. The guides and guideways also maintain the pump centered during vertical movement to facilitate its removal.

When it is desired to install or reinstall the pump into the coolant tank, the pump is lowered to engage the pump guides with the tank guideways. The pump is thus centered with respect to the receptors. Upon further lowering movement of the pump, the lower end of the pump, including the impeller stages, is received through the discharge receptor and the suction inlet is subsequently slidably received in the suction receptor adjacent the bottom of the tank. As this occurs, the lower end wall of the pump discharge head is likewise received through the discharge receptor for sealing engagement on a radially inwardly extending abutment or flange formed along the inside lower end of the discharge receptor. The upper end wall of the discharge head also sealingly engages the upper end of the discharge receptor, thereby forming the sealed pump outlet chamber. Once the discharge head is seated in the discharge receptor, the electric motor is swung into operative position and its drive shaft is coupled with the pump drive shaft whereby operation of the pump may be resumed.

In another form of the invention, the pump and ancillary fittings within the tank are similar to those described previously in the first embodiment In this form, however, the electric motor and drive coupling therefor are replaced by an electric submersible pump motor secured directly on top of the discharge head of the pump.

When it is desired to remove the submersible pump of this embodiment, an overhead crane or other lifting mechanism is simply attached to the submersible motor and the latter is lifted vertically from the tank. When lifting, the lower suction port is disconnected from the suction side of the filter drum and the discharge head is removed from the discharge receptor, the check valve in the outlet conduit automatically closing. No electrical, piping or other mechanical disconnections are necessary to effect pump removal in this embodiment. For example, with a sufficiently long power cord, the pump may be removed and repaired essentially on site. Moreover, because of the substantially shortened height of the combined submersible electric drive motor and the pump due to the direct mounting of the electric motor to the discharge head, very little headroom or access space above the tank is required to remove the submersible pump of this embodiment from the tank.

In a further embodiment hereof, there is provided a combined suction/discharge receptor ring mounted on the false bottom of the clean coolant compartment. The ring has an opening in communication with the outlet conduit. In this form of the invention, the pump comprises a head having spaced end plates between which is mounted an impeller. The lower plate has an opening and the margins of the plates have seals for sealing against the suction/discharge receptor ring when the pump is mounted in the ring with the opening in the end plate in communication with the coolant compartment below the false bottom. Thus, the impeller affords a suction on the filter for flowing clean coolant from the suction side of the filter into the clean coolant compartment and into the pump head and through the opening into the outlet conduit for delivery to the header.

To install this motor/pump unit, the unit is lowered using suitable guides to center the plates for guided movement into the receptor ring. Consequently, both positive suction and discharge connections are afforded in response to the lowering movement of the motor/pump unit. To remove the unit, it is simply lifted from the receptor ring, thereby effecting disconnection on both the suction and discharge sides without the necessity for positively disconnecting pipes or couplings or electrical connections. Also, the check valve automatically closes to separate coolant in the clean compartment from pressurized fluid in the header. As in all embodiments of the invention, the height of the motor/pump unit in this embodiment is substantially reduced in comparison with the height of the vertical turbine-type pump discussed previously and, consequently, only minimal headroom or access space above the tank is necessary to remove and reinstall the pump.

In a still further embodiment of the present invention, there is provided a submersible pump having a lower axial end suction inlet extended for reception in he suction receptor, an impeller, a volute passage having a lateral discharge outlet and a submersible electric motor mounted above the impeller to drive the latter, whereby coolant may be pumped from the suction side of the filter through the end suction inlet through the pump and the lateral discharge outlet. As in the first two embodiments described above, a suction receptor is provided adjacent the tank bottom. In this form, however, a movable coupling is provided between the lateral discharge outlet of the pump and a discharge conduit in communication with the header such that the lateral discharge outlet of the pump may be connected to, and disconnected from, the discharge conduit communicating with the header upon movement of the pump in a vertical direction. To accomplish this, a coupling is provided which is axially movable in a lateral direction into and out of sealing engagement with the pump discharge outlet when the pump is situate in otherwise operative position in the tank. For example, a flexible coupling may be used and displaced axially under control of pneumatic or hydraulic cylinders. Alternatively, a mechanical control may be provided, for example, mechanical cams, to displace the coupling in an axial direction. Thus, upon lowering and guiding the submersible pump into the tank, the axial suction inlet of the pump is disposed in the suction receptor. The lateral discharge conduit is located by the guides opposite the movable coupling. The movable coupling may then be activated to move axially and seal against the lateral discharge outlet of the pump. This places the lateral discharge outlet of the pump in communication with the discharge conduit of the tank.

To remove the submersible pump of this embodiment from the tank, the lifting mechanism is simply attached to the pump. The pneumatic, hydraulic or mechanical drive means are actuated to withdraw the movable coupling from sealing engagement with the lateral discharge conduit. This frees the submersible pump from the discharge connection, it being appreciated that the check valve in the outlet conduit automatically closes as in the previously described embodiments. The pump may then be lifted vertically from the tank, thereby automatically breaking the suction connection.

Significantly, in all of the previously described embodiments of the present invention, the pump may be raised from the tank and lowered into the tank to make positive discharge and suction connections substantially simultaneously and without the need to make any bolted connections or disconnections. Importantly, the prior need for substantial headroom or access space above the tank in order to remove the pumps from the tank is minimized or eliminated. With this system, only a single tradesman is necessary to remove the pumps, thus eliminating substantial labor and expense. Other pumping equipment, for example, the multiple bearings in the elongated shaft of the previously utilized vertical turbine pumps, are entirely eliminated. Further advantages accrue to the foregoing described arrangements which use the submersible pumps in that no lubrication is required except to the extent that the coolant pumped affords lubrication. Noise levels are also virtually non-existent because of the submerged nature of the pumps.

Thus, in accordance with a preferred embodiment of the present invention, there is provided apparatus for pumping liquid comprising a tank for containing the liquid and having an outlet conduit, a pump for operative disposition in the tank below the liquid level therein and having an inlet port, a discharge head and an impeller mounted for rotation about an axis for supplying liquid from the tank through the inlet port to the discharge head. Means are carried by the pump head defining at least in part a chamber for receiving the liquid supplied to the head. Means are also provided cooperable between the tank and the pump for removably mounting the pump in the tank including a housing carried by the tank in communication with the tank outlet conduit, the housing defining in part the chamber when the pump is operatively disposed in the tank whereby liquid from the chamber may be discharged into the tank outlet conduit. Preferably, the housing includes an enclosure for encompassing at least in part the pump head when the pump is mounted in the tank, the pump head including a pair of axially spaced end walls defining the chamber therebetween, and means are carried by the end walls for engaging the enclosure such that the chamber is defined in part between the enclosure and the end walls and lies in communication with the outlet conduit and the inlet port.

In another aspect of the present invention, there is provided apparatus for pumping a fluid, comprising a pump having an inlet port, a head and an impeller mounted for rotation about an axis for pumping fluid through the inlet port to the head, means carried by the pump head defining at least in part a chamber for receiving the fluid supplied to the head, means for removably supporting the pump including a housing having an outlet conduit, and means cooperable between the housing and the pump for removably mounting the pump head in the housing with the housing defining the chamber when the pump head is mounted therein for communicating fluid from the pump head through the chamber into the housing outlet conduit.

In accordance with a further embodiment of the present invention, there is provided a liquid tank for containing a body of liquid having contaminants therein, a filter submerged in the tank for separating the contaminants from the liquid and providing a liquid filtrate, means for removing the separated contaminants from the tank, means for removing the filtrate from the tank including a liquid filtrate outlet conduit carried by the tank and a pump disposed in the tank below the liquid level therein and having an inlet port, a lateral discharge conduit and an impeller mounted for rotation about an axis for applying a suction to the filter and thereby supplying liquid filtrate from the filter through the inlet port to the discharge conduit, means cooperable between the tank and the pump for mounting the pump for movement in a vertical direction between an operative position submerged in the tank and an inoperative position removed from the tank, including a receptor carried by the tank and defining an opening in communication with the filtrate separated by the filter, a connecting element carried by the pump for slip-fit connection with the receptor in response to the vertical movement, a movable connecting member cooperable between the lateral discharge conduit and the filtrate outlet conduit and means for moving the connecting member to afford communication between the conduits when the pump is mounted in the operative position and to break communication between the conduits when the pump is moved from its operative position.

In another aspect of the present invention, there is provided in a tank containing a liquid, a filter having a suction side, communicating means in communication with the suction side of the filter, a filtrate outlet conduit below the liquid level in the tank, and a pump for disposition in the tank below the liquid level therein and having an inlet port, a discharge head and an impeller for suctioning liquid from the tank through the filter, the communicating means and the pump inlet port for discharge through the discharge head into the outlet conduit, a method of installing the pump in the tank below the liquid level thereof comprising the steps of lowering the pump into the tank to a location below the liquid level in the tank, positively effecting below the level of liquid in the tank a suction connection between said pump inlet port and the communicating means on the suction side of the filter and positively effecting below the level of liquid in the tank a discharge connection between the discharge head and the outlet conduit.

Accordingly, it is a primary object of the present invention to provide a novel and improved pump and apparatus for its installation and removal in an industrial filtration system, as well as a novel and improved method for installing and removing the pump whereby the pump may be readily an easily removed from and reinstalled in the filtration tank.

These and further objects and advantages of the present invention will become more apparent upon reference to the following specification, appended claims and drawings.

DESCRIPTION OF THE DRAWING FIGURES

FIG. 7 is an enlarged cross-sectional view of another embodiment of pump hereof situate in the clean compartment of a filtration tank;

FIG. 8 is an enlarged cross-sectional view of still a further embodiment of pump constructed in accordance with the present invention.

DESCRIPTION OF A PREFERRED EMBODIMENT

Reference will now be made in detail to the present preferred embodiment of the invention, an example of which is illustrated in the accompanying drawings.

Figure 1:
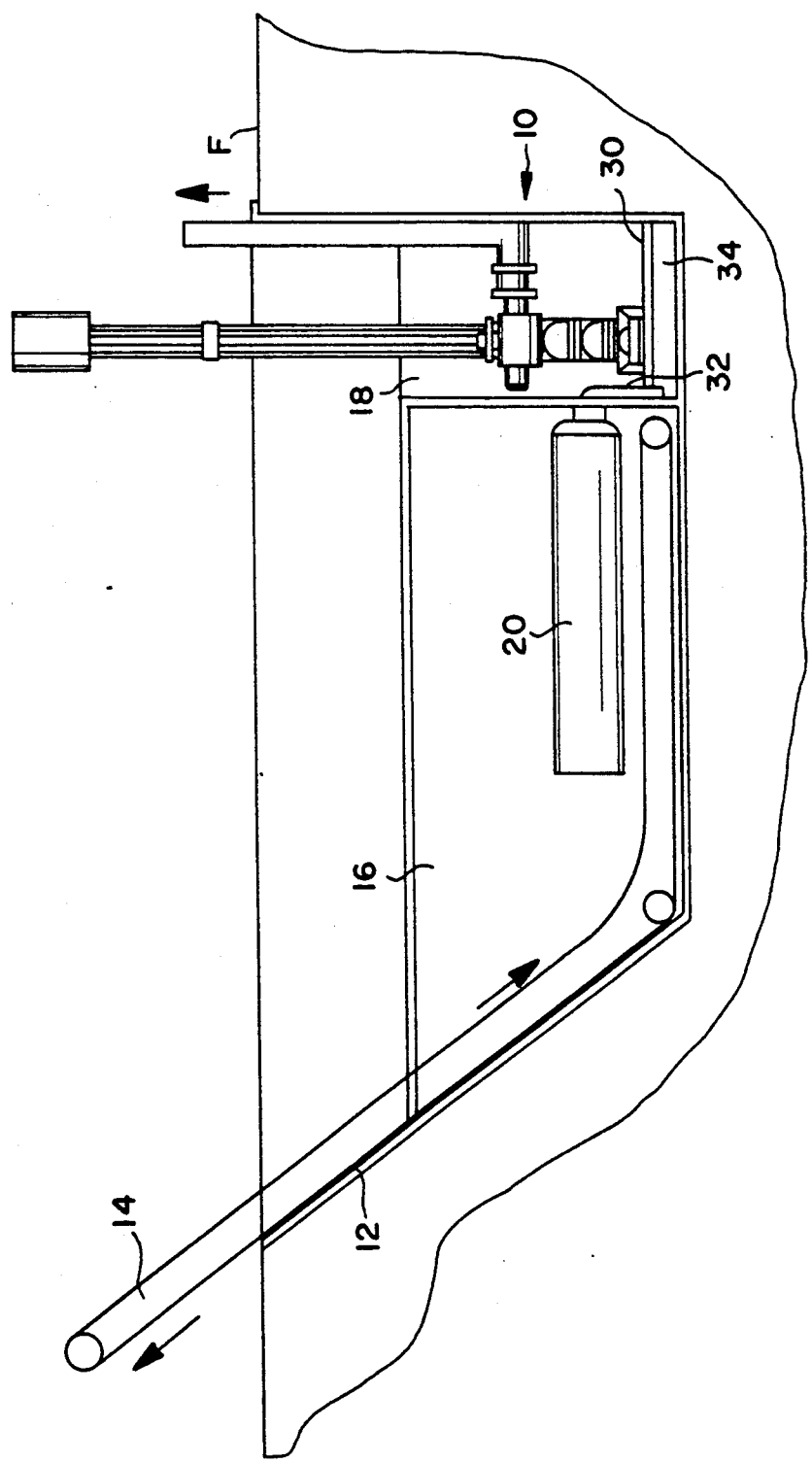
FIG. 1 is a longitudinal cross-sectional view through a filtration tank illustrating a pump constructed in accordance with the present invention installed in operating condition in the tank.

Referring now to the drawing figures, particularly to FIG. 1, there is illustrated a settling tank, generally designated 10, set into a pit disposed below the floor level or elevation F in an industrial environment. Tank 10 is generally rectilinear in configuration but has a sloping end wall 12 for use in conjunction with a dragout conveyor, schematically illustrated at 14. As will be appreciated from the ensuing description, tank 10 is preferably comprised of two discrete compartments, a dirty or contaminated coolant compartment, designated 16, for receiving dirty coolant from sluiceways, not shown, in communication with machine tools, also not shown, and a clean coolant compartment 18 for receiving clean filtered coolant from tank 16.

More particularly, within dirty coolant compartment 16, there is provided one or more, preferably horizontally disposed drum filters 20 for filtering the dirty coolant whereby clean coolant filtrate may be supplied machine tools as explained hereinafter. Drum filter 20 may, for example, comprise a wedgewire suction indexing drum filter manufactured by the assignee of the present invention, Henry Filters, Inc.. This filter per se forms no part of the present invention. Suffice to say that filter 20 comprises an elongated cylindrical drum having fine wire disposed about its periphery. The wire drum collects about its outside surface filter cake composed of contaminants and particles or chips from machine tool operations. Coolant passes through the filter cake and wire into the interior of the drum. More particularly, a suction is drawn on the inside of drum 20 by the pump or pumps of the present invention. Coolant in dirty filter tank compartment 16 thus passes through the filter cake and wire drum and such clean or filtered coolant is supplied by the pump(s) thereof to the machine tools. In the present invention as illustrated, two such filters 20 are provided (FIG. 5), although it will be appreciated that any number of filter drums may be employed, depending upon the requirements of a particular installation. Dragout conveyor 14 is conventional in construction and serves to remove both the solids settled out from the coolant and the filter cake removed from the filter drum 20 by a doctor blade, not shown, both of which settle to the bottom of tank compartment 16. The solids removed from the bottom of the tank by conveyor 14 are deposited in a suitable receptacle, also not shown, at the end of the conveyor. For present purposes, it will be appreciated that clean coolant is supplied from the interior of the one or more filter drums 20 to the machine tools by operation of the pump(s) hereof.

Figure 2:
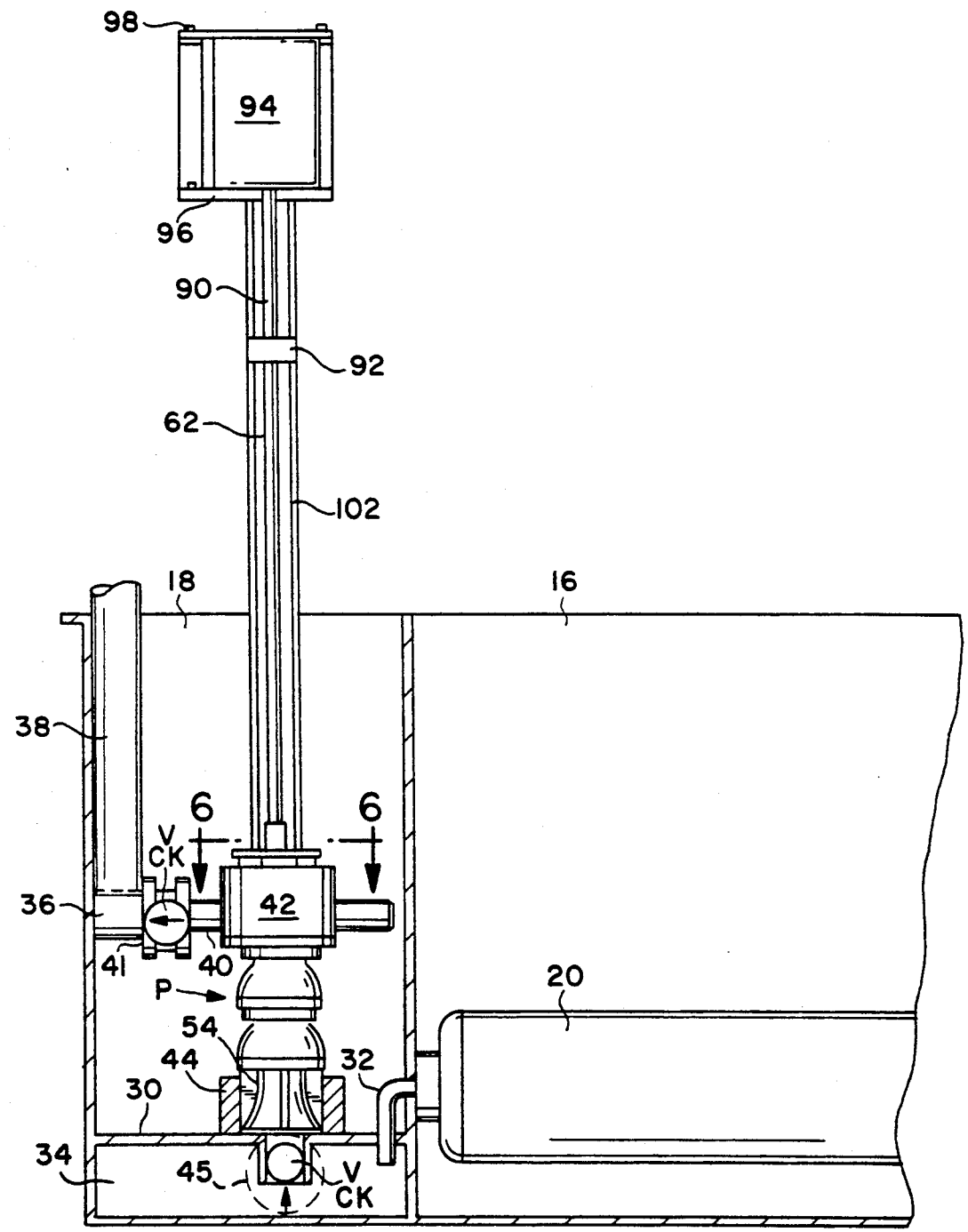
FIGS. 2 and 3 are enlarged cross-sectional views thereof illustrating the pump of FIG. 1 hereof in the clean coolant compartment of the tank in operative and withdrawn positions, respectively.

Clean coolant compartment 18 includes an elevated or false floor 30 above the lower tank wall bottom and which defines a lower chamber 34 for receiving clean coolant from the suction side of filter drum(s) via conduit(s) 32. Referring to FIG. 2, disposed in clean compartment 18 is a header 36 and a main outlet conduit 38 in communication with the header and with suitable piping or conduits, not shown, for connection with the machine tools. Thus, clean coolant is supplied the machine tools from the suction side of filter 20 by way of chamber 34, pump or pumps to be described, header 36, and outlet conduit 38. The purpose of clean coolant compartment 18 is to provide a reservoir of clean coolant which can be supplied the machine tools when the filter drum is indexed for cleaning. Thus, a valve, not shown, is opened affording communication between the clean coolant in chamber 34 and the clean coolant in the remainder of clean coolant compartment 18 above floor 30. In this manner, pump suction is applied to the clean coolant in compartment 18 to supply coolant to the machine tools. The suction or vacuum is also thereby removed with respect to the inside of the filter drum(s) to facilitate cleaning filter cake from the outside surface of the drum. Upon closing this valve, pump suction to the filter drum is reestablished, as will become clear from the ensuing description.

Figure 5:
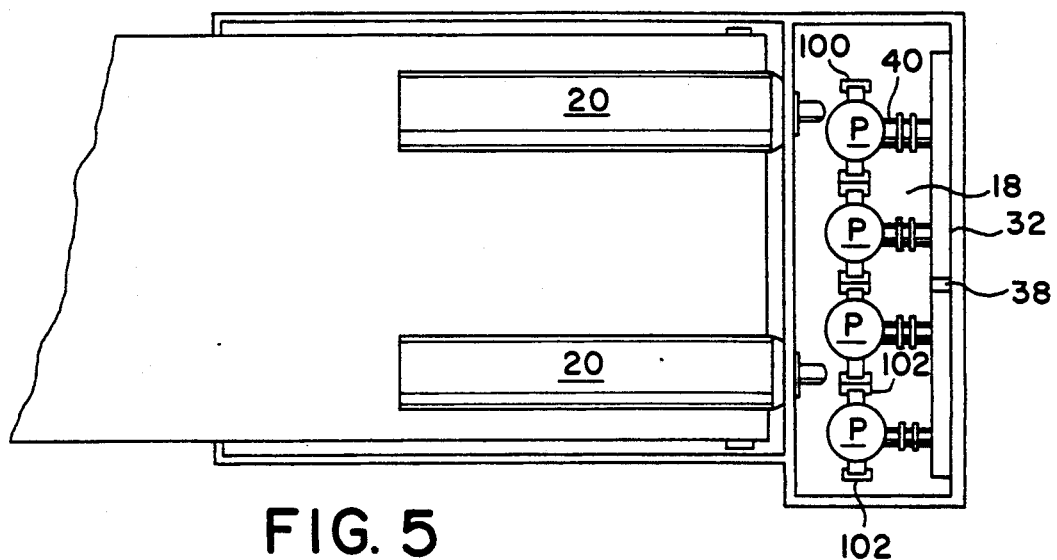
FIG. 5 is a plan view of the tank illustrated in FIG. 1.

In the illustrated exemplary embodiment, as represented by FIG. 5, four pumps, generally designated P, are provided for suctioning clean coolant from filter 20 and supplying it to header 36 via branch outlet conduits 40. Each branch outlet conduit 40 opens at its inner end into a discrete housing or discharge receptor ring 42, which housing 42 receives a portion of the associated pump P, as explained in detail hereinafter. Each branch outlet conduit carries a check valve 41 between discharge housing 42 and its opposite end which is connected to header 36. False floor 30 also mounts a suction receptor, preferably a ring, 44 for each pump. Each receptor 44 receives, preferably in telescoping slip-fit relation, a lower end portion of the associated pump P, the receptor 44 opening into chamber 34. The suction receptor ring may be of the type described and illustrated in U.S. Pat. No. 4,507,061 of common assignee herewith, the disclosure of which is incorporated herein by reference. As will be appreciated from the ensuing description, a discharge housing 42 and a suction receptor 44 are provided for each pump and form part of the structure of tank 12. Thus, except for the pump per se, all of the piping, conduits and valves form fixed parts of the tank. Additionally, for each pump embodiment described and illustrated herein where multiple pumps are used, it is preferably to provide a check valve in conjunction with the suction receptor 44. Such check valve is schematically designated 45 in FIG. 2 and may be of the type disclosed in previously-mentioned U.S. Pat. No. 4,507,061 to automatically prevent communication between chamber 34 and the remainder of clean coolant compartment 18 upon removal of the associated pump.

Figure 3:
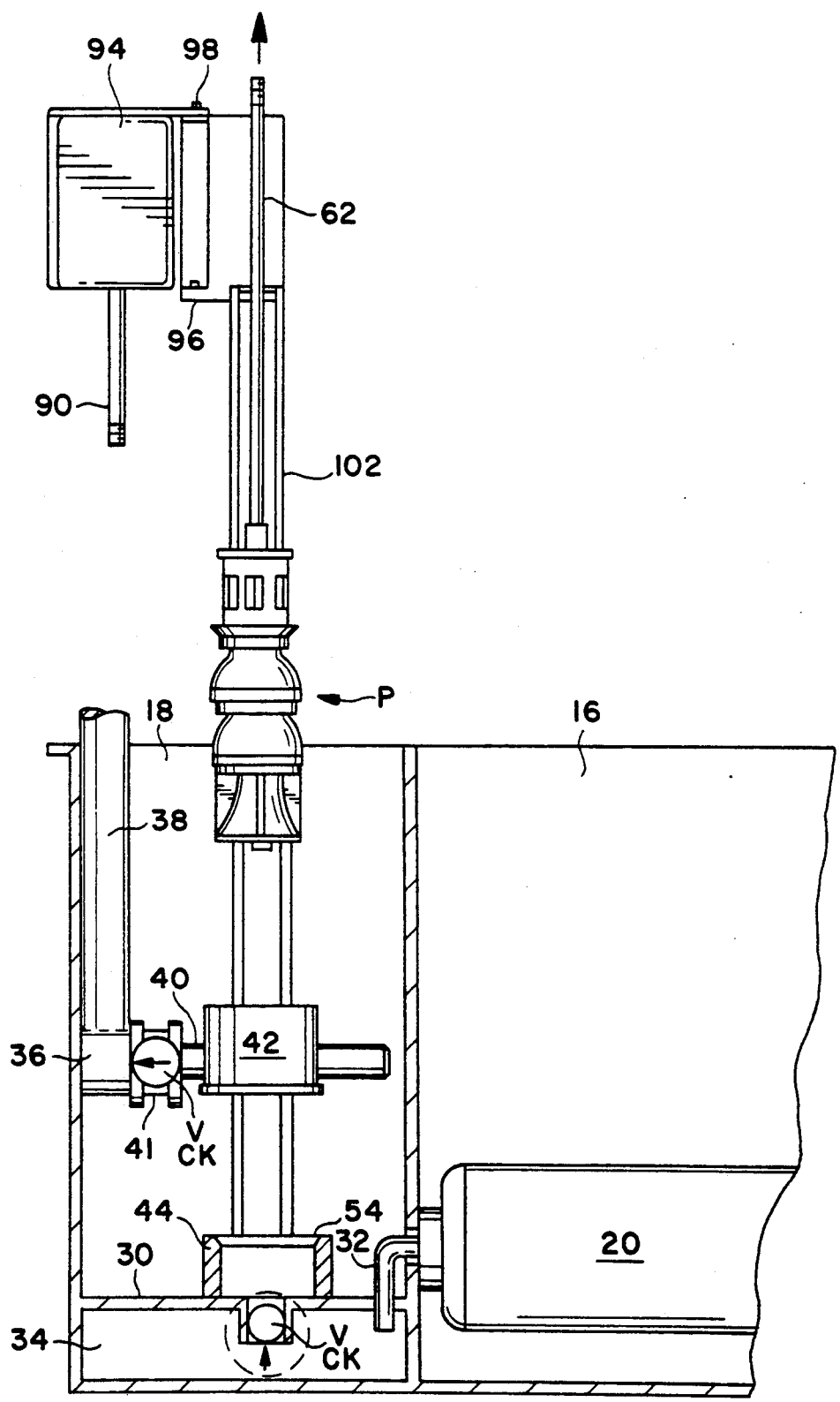
Figure 4:
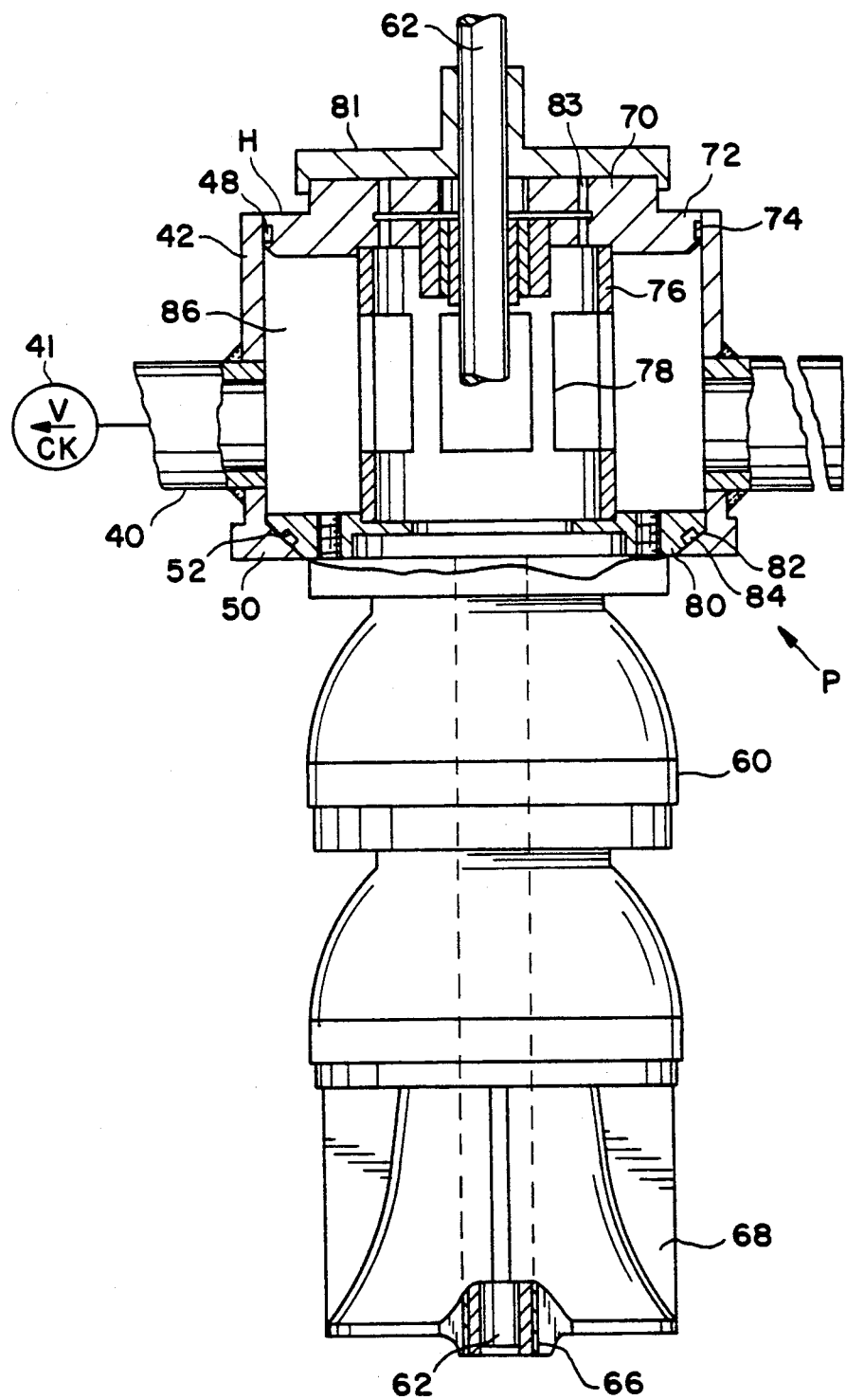
FIG. 4 is an enlarged cross-sectional view of the pump illustrated in FIG. 1 installed in the tank housing or discharge receptor ring.

Referring now more particularly to FIG. 4, the discharge housing or receptor 42 has an upper outwardly flared or tapered edge 48 and an inwardly directed flange 50 adjacent its lower end, also having an inwardly and downwardly tapered flare 52. Similarly, the upper end of suction receptor 44, as illustrated in FIGS. 2 and 3, is also provided with a downwardly and inwardly directed flare 54 for reasons which will become apparent from the ensuing description. It will be appreciated that each housing 42 is structurally supported in and by tank 16 by means, not shown, for supporting the associated pump.

Referring now to FIG. 4, pump P is illustrated in its installed position in the tank. Pump P has a plurality of axially spaced outer casings 60 each housing an impeller, not shown, of a turbine stage driven by a shaft 62 extending through the pump discharge head H and terminating at its lower end in a bearing 66 secured to pump casing 60. It will be appreciated that the lower end of the pump below the turbine stages terminates in an axial inlet suction port. Consequently, it will be appreciated that fluid in communication with the lower end of pump P, i.e., coolant in chamber 34, will be pumped upwardly by the impellers into the pump discharge head H.

Pump head H includes an upper end wall 70 including an enlarged diameter end wall or plate 72. End plate 72 has an annular groove for receiving a seal, preferably an O-ring, 74. When pump P is installed, as illustrated in FIG. 4, seal 74 bears against the inside surface of discharge housing 42. Pump head H also includes an internal pump head discharge pipe 76 of reduced diameter having a plurality of circumferentially spaced openings 78. The lower end of discharge pipe 76 is secured to an enlarged diameter end wall or plate 80 having a lower downwardly and inwardly flared or tapered surface 82. Surface 82 includes an annular groove for receiving a seal, preferably an O-ring 84.

It is a significant feature of the present invention that the various parts of the pump are specifically sized in relation to the discharge receptor 42 and suction receptor 44 carried by the tank to facilitate installation and removal of the pump without connecting and disconnecting the various pipes and valves. For example, the outer diameter of impeller casing 60 is slightly less tan both inner diameters of the lower end 50 of housing 42 and suction receptor 44. Consequently, the impellers and ancillary parts may be disposed axially through housing 42 such that the lower end portion of pump P may be received within seat 44. End wall 80 has a diameter and a corresponding shape such that its seats on the flared or tapered surface 52 of end 50. End plate 72 is sized such that it may be received within housing 42 with seal 74 in bearing engagement against the interior surface of housing 42. Consequently, from a review of FIG. 4, it will be appreciated that the pump may be lowered into the illustrated operative position by passing the impeller stages through housing 42 to slip-fit the suction inlet port into suction receptor 44 with the discharge head engaging in the housing 42. To withdraw the pump, it may simply be lifted from the tank with the head H, lower impeller stages passing through housing 42.

It will also be observed that, when the pump is disposed in an operative position in the tank, an annular chamber 86 is formed between the pump discharge pipe 76, end plates 72 and 80, and the interior surface of housing 42. Discharge chamber 86 thus lies in communication through pipe 76 with the pump suction inlet port at 68 and with branch outlet conduit 40 which forms part of structure integral with the tank.

Referring also to FIG. 4, a pump shaft 62 is fixed to an upper, generally cup-shaped, bearing member 81 in spaced opposition to end wall 70. Holes 83 are formed in end wall 70 to communicate the liquid being pumped under pressure into the space between end wall 70 and member 81 to form an axial thrust bearing, the axial thrust bearing may be a hydrostatic, hydrodynamic or a hybrid hydrostatic-hydrodynamic thrust bearing. Consequently, in operation, the axial thrust of the impellers is taken up by the axial thrust bearing and transmitted to housing 42.

Referring now to FIGS. 2 and 3, pump shaft 62 is elongated, extends to a location above tank 16 and there connects with an electric motor drive shaft 90 by a releasable coupling 92. Thus, each of the pumps P has an associated electric motor 94 which drives its motor shaft 90 and, when coupled to pump shaft 62 through coupling 92, drives the impellers of the associated pump to pump clean coolant from clean coolant tank 80 into header 36 for delivery to the machine tools.

It is an important feature of the present invention that the submersible pump P is readily removed from and reinstalled into tank 16. To accomplish this in part, each electric motor 94 is mounted on a support structure 96 hinged at 98 to an ancillary support, not shown. In this manner, each electric motor 94 may be swung about a vertical axis when disconnected from the corresponding pump drive shaft 62 into a position, for example, illustrated in FIG. 3, out of the way of the pump drive shaft 62. This enables the pump to be hoisted vertically without also lifting the electric motor.

Figure 6:
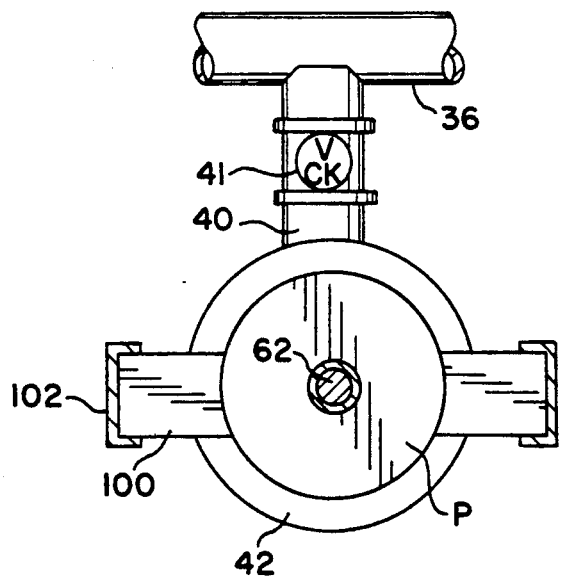
FIG. 6 is a cross-sectional view of the installed pump taken generally about on line 6—6 in FIG. 2.

With reference to FIGS. 2 and 6, means are provided for guiding each pump into and out of operative relation with its associated discharge receptor ring 42 and the suction receptor ring 44. Such means may include, for example, a pair of radially outwardly projecting guides 100 carried by pump P for reception in vertically extending, laterally spaced guideways 102. Guideways 102 may be secured to the tank and comprise channels opening toward one another for receiving the ends of guides 100 of the pump. A set of such guideways are provided each pump.

In use, it will be appreciated that, when each pump is operatively installed in the tank as illustrated in FIG. 2, clean coolant from the suction side of filter 20 via conduit 32 and chamber 34 may be pumped through pump head H and into the annular chamber 86 defined by discharge pipe 76, end plates 72 and 80 and housing 42. Clean coolant is thus discharged by the pump into branch conduit 40 for delivery past check valve 41 to header 36 and to the machine tools. When it is desired to remove one of the pumps from the tank, for example, for maintenance purposes, the coupling between its drive shaft 62 and motor shaft 90 is released. Motor 94 is then displaced laterally about vertical axis 98 into an out-of-the-way position, as illustrated in FIG. 3. Any suitable lifting mechanism, not shown, but for example an overhead crane, may then be employed to lift pump P upwardly from its support in housing 42. Particularly, the pump is lifted such that head H is displaced upwardly out of housing 42 and the lower end of the pump is withdrawn from its slip-fit telescopic relation with suction receptor ring 44. Further lifting of the pump causes impeller casing 60 to pass through housing 42. The guides 100, acting in guideways 102, serve to maintain the pump aligned with the housing 42 such that the impeller casings 60 may be withdrawn through housing 42. Once withdrawn from housing 42, the pump can be canted such that it can be removed from guideways 102 or simply lifted to an elevation above the guideways 102. It will be appreciated that the check valve 41 closes as well as check valve 45, if multiple pumps are employed, upon removal of pump P.

To installor reinstall a pump, for example, after maintenance has been provided, the associated electric motor 94 is swung into an out-of-the-way position, as illustrated in FIG. 3. The pump is lifted such that guides 100 are disposed in guideways 102. The pump is then lowered into the clean coolant compartment 18. Because of the cooperating guides 100 and guideways 102, the pump is guided such that impeller casings 60 are received through housing 42. Further lowering of the pump causes the lower end of the impeller pump to engage in slip-fitting in or telescopic relation with suction receptor ring 44. The upper chamfered edge of ring 44 serves to guide the lower end of the pump into ring 44. The pump is lowered until the lower end wall 80 of pump head H seats against the lower end 50 of housing 42 and is supported thereby. Once seated, it will be appreciated that the upper end wall 72 also lies within housing 42, thereby forming sealed chamber 86. The electric motor 94 is then swung into position in vertical registry above drive shaft 62 and coupling 92 is applied to connect motor drive shaft 90 and pump shaft 62.

It will be appreciated that the withdrawal and reinstallation of the pump is thus accomplished without connecting or disconnecting any fittings, piping or electrical connections other than drive shaft coupling 92, or manually manipulating any valves. The pump rests in housing 42 without physical securement thereto with the lower end of the pump in communication with the chamber 34 for suctioning the filter and delivering clean coolant to the machine tools. It will also be appreciated that any one or more of the pumps may advantageously be removed at any particular time without interruption of the supply of clean coolant to the machine tools. That is, the capacity of the pumps is such that the removal of one pump at any one time will not substantially adversely affect the supply of coolant to the machine tools.

Referring now to the embodiment hereof illustrated in FIG. 7 wherein like reference numerals are applied to like parts as in the preceding embodiment, followed by the letter suffix "a", there is illustrated a pump Pa disposed in the clean compartment 18a of a tank, configured similarly as the clean compartment of the preceding embodiment. That is, clean compartment 18a includes a false bottom 30a which defines a lower chamber 34a in communication via pipe 32a with the suction side of the filter, not shown. A receptor ring 44a is disposed on false bottom 30a about its opening. Additionally, a discharge receptor ring 42a is suitably structurally supported in the compartment 18a and has a branch outlet conduit 40a in communication with a header 36a which, in turn, communicates with a main outlet conduit 38a. A check valve 41a is disposed in branch conduit 40a. A check valve 45a is also disposed below suction receptor 44a.

Pump Pa is removably mounted in the foregoing described discharge receptor ring 42a and suction receptor ring 44a as in the previous embodiment. Thus, pump Pa comprises a pump discharge head Ha, having end plates 72a and 80a spaced one from the other to define with pump 76a and discharge receptor ring 42a an annular chamber 86a. The chamber 86a receives coolant pumped by impellers within casings 60a from chamber 34a for discharge through branch outlet conduit 42a, past check valve 41a, into header 36a.

In this form of the invention, the drive for pump Pa is provided by a submersible electrical motor 100 mounted directly on top of head Ha. Electric submersible motor 100 has a drive shaft 102 suitably carried by radial and axial thrust bearings 104 within motor 100 for driving the shaft 62a of pump Pa. A suitable connection is made between pump shaft 62a and drive shaft 102, for example, a splined and pinned connection, the pin being indicated at 106.

As will be appreciated, in this embodiment, the submersible motor 100 is disposed, together with pump Pa, below the coolant level in the tank and no piping connections are required. An electrical line, not shown, for supplying electrical energy to pump 100, is the only connection to motor 100. It will be appreciated, therefore, that motor 100, together with the integrally attached pump Pa, form a single unit which may be installed in and removed from the tank. To accomplish this, electric motor 100 has an eye, not shown, at its top to facilitate coupling with the hook of a crane or other lifting mechanism. The motor 100 and associated pump Pa is lowered into the tank using the guide arrangement described in FIG. 6 with respect to the previous embodiment. The guides and guideways therefore guide the impeller casings 60a through the discharge receptor ring 42a for slip-fit engagement with the suction receptor 44a at the lower end of compartment 18a. Pump discharge head Ha also is received in the discharge receptor ring 42a and seals at its opposite ends when seated therein by O-ring seals 74a and 84a. Consequently, the liquid in chamber 34a is placed in communication with header 36a by means of the communication provided through suction receptor ring 44a, the impellers in casings 60a, through the internal pipe passage within conduit 76a, openings 78a, annular chamber 86a, and outlet conduit 40a, and past check valve 41a. Electrical operation of motor 100 therefore supplies clean coolant from the suction side of the filter, not shown in the drawing of this embodiment, to the main outlet conduit 38a.

To remove the motor/pump unit of this embodiment, the hook of a crane or a lifting mechanism is connected to the eye of motor 100. The motor/pump unit is then lifted without any disconnection of piping or the electrical connection or manual operation of check valves within compartment 18a. Consequently, head Ha is unseated and withdrawn from discharge receptor ring 42a and pump casings 60a are withdrawn from suction receptor ring 44a and through discharge receptor ring 42a. Check valve 41a automatically closes a preclude communication between the header and compartment 18a. The motor/pump unit may then be hoisted above the coolant level and serviced. It will be appreciated that, because the motor/pump unit is entirely submerged in the coolant, any lubrication necessary is provided by the coolant liquid being pumped. Also, by its total submersion, noise levels are effectively suppressed by the surrounding liquid. Additionally, the overall height of the motor/pump unit is quite small in relation to the overall height of vertical turbine pumps previously used, as described hereinbefore, and consequently very little headroom or access space above the tank is necessary in order to install and remove the pump of this embodiment.

Referring now to the embodiment hereof illustrated in FIG. 8, wherein like reference numerals are applied to like parts as in the first-described embodiments, followed by the suffix "b", there is illustrated a combination submersible motor/pump unit having a radial discharging impeller design rather than turbine stages for axial flow. As in the previous embodiment, the motor/pump unit hereof is mounted in the clean coolant compartment 18b and on top of the false bottom 30b overlying lower chamber 34b in communication with the suction side of the filter, not shown. The outlet branch conduit 40b lies in communication with a header 36b through a check valve 41b, the header 36b lying in communication with the main outlet conduit 38b.

In this form, there is disposed on top of false bottom 30b, a combination suction/discharge receptor ring 110 secured to bottom 30b and having an outlet opening 113 in communication with branch outlet conduit 40b. In this form, the pump Pb comprises an impeller disposed in a housing defined between end plates 112 and 114. The end plates have circular O-ring seals 116 and 118 about their margins for sealing with the receptor ring 110 when the motor/pump unit is in operative position in the tank as illustrated. The pump Pb includes an inner annular wall 120 having a plurality of openings 122 around its periphery. Thus, liquid may be suctioned into the interior of the pump by impeller 111 through the opening in the false bottom 30b and a central opening through end plate 114 for discharge through openings 122 into the annular chamber 124 defined between wall 120 and receptor ring 110 and end plates 112 and 114 for discharge through opening 113 to outlet conduit 40b. Mounted on top of the pump head Hb is a submersible electric motor 126 having a drive shaft 128 coupled to impeller 111 for driving the latter.

As in the previous embodiment, the motor/pump unit hereof may be readily installed in and removed from the tank. To accomplish this, the motor/pump unit is lowered by a crane or lifting mechanism and guided by suitable guides, not shown, for example, of the type illustrated in FIG. 6, such that the end plates 112 and 114 are received within the receptor ring 110. The motor/pump unit is lowered until the lower end plate 114 bears against the false bottom 30b, thus ensuring that seals 116 and 118 seal the pressurized discharge chamber 124 from the surrounding liquid. It will be appreciated that, when in the operative position as illustrated, the impeller 111 applies a suction to the suction side of the filter, drawing clean coolant into the pump for discharge through openings 122 into annular chamber 124 and discharge through opening 113 into the branch outlet conduit 42b. Thus, both positive suction and discharge connections are afforded and without any additional piping or electrical connections or valve manipulation.

To remove the motor/pump unit illustrated in FIG. 8 from the tank, the hook of a crane or lifting mechanism is attached to motor 126 and the motor/pump unit is lifted. By lifting this unit, the head Hb is removed from the receptor ring 110, breaking the suction and discharge connections but without the necessity for any physical disconnection. Check valve 41b automatically prevents communication between the pressurized discharge liquid in the header and main outlet conduit 38b and the liquid in the clean compartment. A check valve, not shown, may also be provided at the suction inlet to receptor ring 110, where multiple pumps are employed, to automatically prevent communication between chamber 34b and the remainder of compartment 18b upon removal of the pump. As in the previous embodiment, the overall height of this unit is much less in comparison with the height of the vertical turbine unit previously discussed and thus the need for headroom or access space above the tank is minimized.

Figure 9:
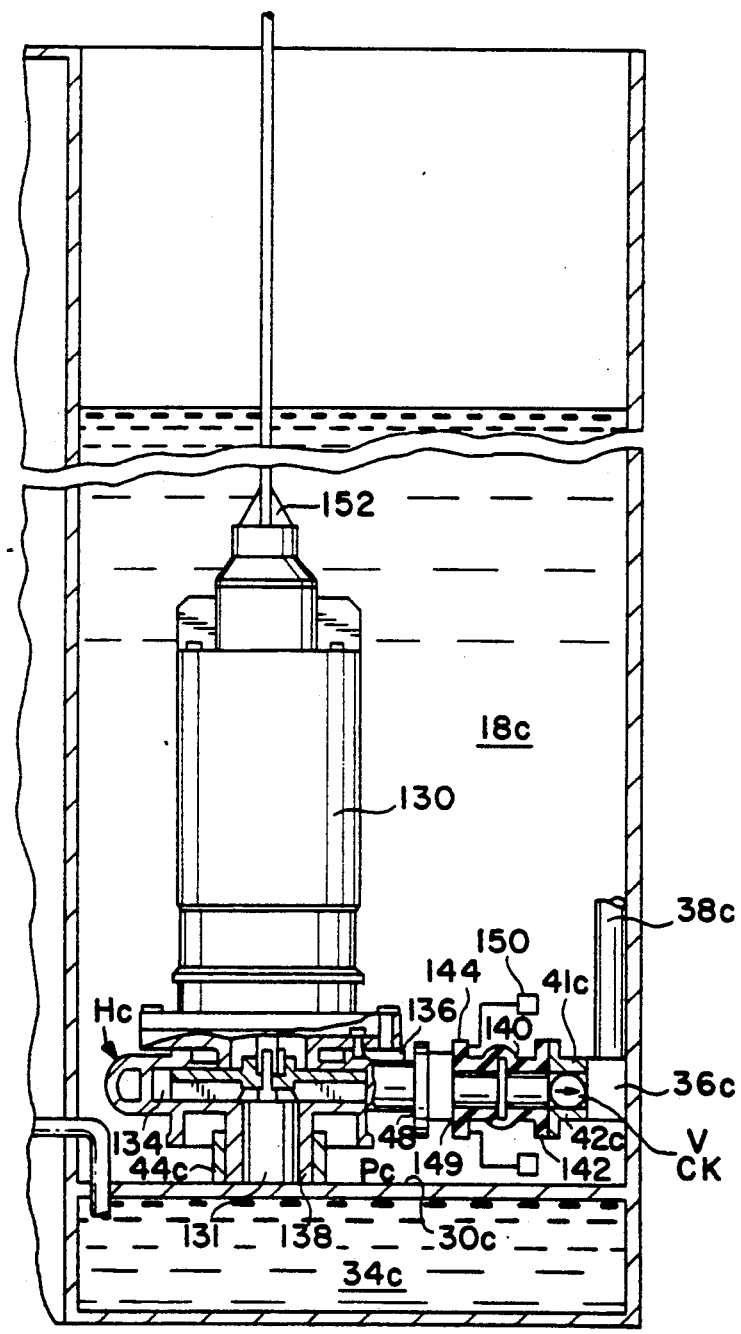
FIG. 9 is an enlarged cross-sectional view of still another embodiment of a pump constructed in accordance with the present invention.

Referring now to the embodiment hereof illustrated in FIG. 9, wherein like reference numerals are applied to like parts as in the first embodiment, followed by the suffix "c", there again is illustrated a motor/pump unit for use in the clean coolant tank 18c for pumping clean coolant from chamber 34c through the opening in the false bottom 30c into the branch outlet conduit 42c and header 36c. In this form, however, there is provided a submersible motor 130 coupled to a pump having an end suction inlet port 131 and a side discharge outlet 136. Except for the modification to the pump head Hc to provide a slip-fit telescopic connection with the suction receptor ring 44c mounted on false bottom 30c, the pump Hc and motor 130 are conventional. Thus, the pump head Hc includes an impeller 132 and a volute 134 whereby liquid is suctioned through the end suction inlet port for passage through the volute 134 to discharge through the lateral discharge port 136. Instead of the feet conventionally provided on submersible motor/pump combinations of this type whereby the end suction inlet is spaced from a supporting floor and draws a suction on the surrounding fluid, the feet are removed and an elongated sleeve 138 is provided in order that the slip-fit telescopic connection may be made with the suction receptor ring 44c.

It will be recalled that a principal feature of the present invention resides in the capacity to lower and raise the motor/pump unit by a simple vertical movement without physical connection or disconnection of piping and to minimize the headroom necessary above the tank. To accomplish that in this embodiment, there is provided on the branch outlet conduit 42c a flexible coupling 140. Coupling 140 comprises essentially an expansion joint which may be movable under positive control by pneumatic, hydraulic or mechanical means. That is to say, the coupling 140 has coupling flange 142 and 144 at its opposite ends. Flange 142 is secured to a corresponding flange on the branch outlet conduit 42c. The flange 144, however, is movable axially toward and away from the conduit 42c and, hence, toward and away from a flange 148 carried on the discharge outlet 136 of pump Pc. A preferably integrally formed annular rib 149 may project axially from flange 144 to effect a seal with the flange 148 when the former is moved into engagement with the latter. As mentioned, the positive displacement and retraction means may comprise suitable pneumatic, hydraulic or mechanical mechanisms schematically represented at 150. Such pneumatic or hydraulic mechanisms may comprise cylinders operable to advance and retract collar 144 in the axial direction as illustrated. In the alternative, mechanical camming mechanisms operated by levers manipulated from above the tank may be used to extend and retract flange 144. It will also be appreciated that the coupling 140 may be carried by the discharge conduit 136 as part of the pump. In this manner, the pneumatic, hydraulic or mechanical actuating means may also be carried by the pump to extend and retract, for example, to engage and disengage flange 142 relative to the outlet conduit 42c.

To install the motor/pump unit illustrated in FIG. 9, the crane or lifting mechanism is coupled to the eye 152 carried by motor 130 and the motor/pump unit is lowered into the tank and guided by suitable guides, for example, those illustrated in FIG. 6, such that the sleeve 138 forms a slip-fit telescopic connection with the suction receptor ring 44c and sleeve 138 seats on the false bottom 30c. It will be appreciated that the guides and guideways have located the lateral discharge port 136 of the pump head Hc in a predetermined position relative to the branch outlet conduit 42c. Consequently, by activating the pneumatic, hydraulic or mechanical camming mechanisms 150, the coupling 140 is axially expanded such that flange 144 and the sealing rib carried thereby engage and seal against flange 148 of the discharge port 136. Thus, the positive suction and discharge connections are made without the necessity for laborious pipe connections or manipulation of valves.

To remove the motor/pump unit hereof, the crane is coupled to the unit. The pneumatic, hydraulic or mechanical mechanisms are activated to retract the flange 144 of coupling 140 from the lateral discharge port 136 of the pump head Hc. The check valve 41c automatically closes, as does the check valve, not shown, at the inlet to the suction receptor. The crane or lifting mechanism is then activated to lift the motor/pump unit from the compartment whereby the suction connection is automatically disconnected and the motor/pump unit is otherwise free of all piping connections.

Thus, it will be appreciated that the objects of the present invention are fully accomplished in that there has been provided a pump which may be readily and easily removed from and installed in a clean coolant compartment of a filtration tank without effecting any mechanical connection or disconnection within the tank itself and without interruption of the flow of clean coolant from the tank.

While the invention has been described in connection with what is presently considered to be the most practical and preferred embodiment, it is to be understood that the invention is not to be limited to the disclosed embodiment, but on the contrary, is intended to cover various modifications and equivalent arrangement included within the spirit and scope of the appended claims.

What is claimed is:

1. Apparatus for pumping liquid, comprising:
a tank for containing the liquid and having an outlet conduit;
a pump for operative disposition in the tank below the liquid level therein and having an inlet port, a discharge head having a pump support portion and an impeller mounted for rotation about an axis for supplying liquid from the tank through said inlet port to said discharge head;
means carried by said pump discharge head defining at least in part a chamber for receiving the liquid discharge from said head; and
means arranged between said tank and said pump for removably mounting said pump in said tank including a housing having seating means for said discharge head structurally supported by said tank and engaging the pump support portion of said discharge head for supporting said pump in said tank when said pump is disposed in said tank and lying in communication with said tank outlet conduit, said housing defining in part said chamber for communicating liquid from the discharge head through said chamber into said tank outlet conduit.

2. Apparatus according to claim 1 wherein said housing including an enclosure for encompassing at least in part said pump discharge head when said pump is disposed in said tank, said pump head including a pair of axially spaced end walls defining said chamber therebetween, and means carried by said end walls for engaging said enclosure such that said chamber is defined in part by said enclosure and said end walls and lies in communication with said outlet conduit and said inlet port.

3. Apparatus according to claim 2 wherein said pump is removable from and replaceable in said tank by movement thereof through said housing, said apparatus further including guide means arranged between said tank and said pump for guiding said pump for movement thereof relative to said tank.

4. Apparatus according to claim 2 wherein said pump is removable from and replaceable in said tank, said tank including a receptor located in said tank below said enclosure, said pump having an element cooperable with said receptor to provide communication between said pump inlet and said tank, said pump having portions below said pump head including said element of a size to enable said lower pump portions to pass through said enclosure upon removal and replacement of said pump.

5. Apparatus according to claim 4 including guide means arranged between said tank and said pump for guiding said pump upon movement of said pump relative to said tank to guide said lower pump portions through said enclosure.

6. Apparatus according to claim 1 including means carried by said tank above the level of liquid in the tank for driving said pump, means for releasably coupling said pump and said drive means one to the other, and means carried by said tank for movably mounting said drive means between a first driving position coupled to said pump and a second non-driving position uncoupled from said pump to facilitate removal of the pump from said tank.

7. Apparatus according to claim 6 wherein the axis of said pump is generally vertical, said drive means having a drive shaft in vertical alignment with said pump axis in said driving position thereof, said drive means being mounted to said tank for pivotal movement about a vertical axis offset from the pump axis whereby movement of said drive means about its vertical pivot axis from said first driving position toward said second non-driving position misaligns the axis of said pump and said drive means.

8. Apparatus according to claim 6 including means for mounting said drive means for pivotal movement about an axis generally parallel to said pump axis whereby said drive means may be pivoted about the axis of said drive mounting means for movement between said first and second positions.

9. Apparatus according to claim 1 wherein said housing includes a generally cylindrical discharge receptor ring for encompassing at least in part said pump head when said pump is seated in said tank, said pump head being generally cylindrical in shape and including a pair of axially spaced generally cylindrical end walls in part defining said chamber therebetween, and means carried by said end walls for engaging said housing such that said chamber is generally annular and defined in part by said receptor ring and said end walls and lies in communication with said outlet conduit and said inlet port.

10. Apparatus according to claim 9 wherein said receptor has an opening in communication with said outlet conduit.

11. Apparatus according to claim 9 wherein said pump is removable from and replaceable in said tank by movement through said housing, guide means arranged between said tank and said pump for guiding said pump upon movement thereof relative to said tank.

12. Apparatus according to claim 9 wherein said pump is removable from and replaceable in said tank, said tank including a receptor located in said tank below said enclosure, said pump having an element cooperable with said receptor to provide communication between said pump inlet and said tank, said pump having portions below said pump head including said element of a size to enable said lower pump portions to pas through said enclosure upon removal and replacement of said pump.

13. Apparatus according to claim 12 including guide means arrangement between said tank and said pump for guiding said pump upon movement of said pump relative to said tank to guide said lower pump portions through said enclosure.

14. Apparatus according to claim 1 including an electric submersible motor connected to said pump to drive the pump and mounted for movement with said pump below the liquid level in said tank.

15. Apparatus according to claim 1 including means carried by said tank above the level of liquid in the tank for driving said pump and including a drive shaft and means for releasably coupling said pump and said drive means one to the other, means carried by said tank for movably mounting said drive means between a first driving position relative to said pump and a second non-driving position uncoupled from said pump to facilitate removal of the pump from said tank.

16. Apparatus according to claim 15 wherein the axis of said pump is vertical and said drive shaft lies in vertical alignment with said axis in said driving position of said drive means and is misaligned with said axis upon movement of said drive means into said second non-driving position.

17. Apparatus according to claim 16 including means for mounting said drive means for pivotal movement about an axis generally parallel to said pump axis whereby said drive means may be pivoted about said drive means mounting axis for movement between said first and second positions.

18. Apparatus for pumping a fluid, comprising:
a pump having an inlet portion, a discharge head having a pump support portion and an impeller mounted for rotation for pumping fluid through said inlet port to said discharge head;
means carried by said pump head defining at least in part a chamber for receiving the fluid supplied to said discharge head; and
means for removably supporting said pump including a housing having seating means for said discharge head and an outlet conduit; said seating means engaging the pump support portion of said discharge head for supporting said pump head in said housing when said pump head is disposed therein and lying in communication with said outlet conduit, said housing defining in part said chamber for communicating fluid from said pump discharge head through said chamber into said housing outlet conduit.

19. Apparatus according to claim 18 wherein said housing includes an enclosure for encompassing at least in part said pump discharge head when said pump is disposed in said housing, said pump head including a pair of axially spaced end walls defining said chamber therebetween, and means carried by said end walls for engaging said enclosure such that said chamber is defined in part between said enclosure and said end walls and lies in communication with said outlet conduit.

20. Apparatus according to claim 19 wherein said pump is removable from and replaceable in said housing by movement thereof through said housing, and said supporting means mounting said pump for movement relative to said housing in one direction and against movement relative thereto in the opposite direction.

21. In combination, a tank for containing liquid and a pump mounted for movement between a first operative position in said tank below the liquid level therein for pumping the liquid and a second inoperative position removed from said tank, said pump having an inlet portion, a discharge head having a pump support portion and an impeller mounted for rotation for pumping the liquid from said tank through said inlet port to said discharge head;
means for connecting said pump inlet port and said tank in response to movement of the pump into said first operative position in said tank to provide a liquid suction connection therebetween; and
means for connecting said pump discharge head and said tank soley in response to movement of said pump into said first operative position to provide a liquid discharge connection therebetween and including seating means for said discharge head structurally supported by said tank and engaging the pump support portion of said discharge head for supporting said pump in said tank when said pump is moved to said operative position.

22. The combination according to claim 21 including guide means arranged between said tank and said pump for guiding said pump for movement thereof relative to said tank.

23. The combination according to claim 21 wherein said inlet port and said discharge head define flow passages substantially perpendicularly related one to the other.

24. Apparatus for mounting a pump having a discharge head in a tank containing a liquid comprising:
support means arranged on said pump discharge head and cooperable with seating means fixedly secured to and within said tank below the liquid level therein and including a discharge conduit;
inlet port means associated with said pump inlet and cooperable with suction conduit means fixedly secured to said tank about a tank inlet, wherein said pump is mountable in operative engagement with said tank solely by engagement of said support and seating means and said inlet port and suction conduit means, respectively.

25. In a tank containing a liquid, a filter having a suction side, communicating means in communication with the suction side of the filter, a filtrate outlet conduit below the liquid level in the tank, and a pump for disposition in the tank below the liquid level therein and having an inlet port, a discharge head and an impeller for suctioning liquid from the tank through said filter, said communicating means and said pump inlet port for discharge through said discharge head into said outlet conduit, a method of installing the pump in the tank below the liquid level thereof comprising the steps of:
lowering the pump into the tank to a location below the liquid level in the tank;
positively effecting below the level of liquid in the tank in response to movement of said pump along a predetermined linear direction a suction connection between said pump inlet port and said communicating means on the suction side of the filter; and
positively effecting below the level of liquid in the tank in response to movement of said pump along a predetermined linear direction a discharge connection between said discharge head and said outlet conduit.

26. A method according to claim 25 wherein said step of effecting a positive suction connection and effecting a positive discharge connection are in response solely to lowering movement of said pump into said tank.

27. A method according to claim 25 including providing a receptor for said pump in said tank below the liquid level therein having an opening in communication with said outlet conduit, disposing said discharge head in said opening of said receptor in response to lowering said pump into said tank to provide liquid communication between said discharge head and said outlet conduit.

28. A method according to claim 27 including sealing said discharge head and said receptor one to the other below the liquid level in the tank to isolate the liquid discharge of the pump from the liquid in the tank.

29. A method according to claim 27 including the steps of providing a suction receptor in the tank and providing a slip-fit between said suction receptor and said pump inlet port in response to lowering said pump into said tank.

30. A method according to claim 25 including the steps of removing the pump from the tank by lifting the pump from the tank and disconnecting the suction connection in response to the lifting movement of the pump from the tank without disconnection of any pipe couplings.

31. A method according to claim 30 including disconnecting the discharge connection in response to lifting movement of the pump from the tank and without disconnection of any pipe couplings.

32. In a tank containing a liquid, a filter having a suction side, communicating means in communication with the suction side of the filter and a filtrate outlet conduit below the liquid level in said tank, and a pump for disposition in the tank below the liquid level therein and having an inlet port forming said communicating means a suction connection, a discharge head forming with said outlet conduit a discharge connection, and an impeller for suctioning liquid from the tank through said filter, said communicating means and said pump inlet port for discharge through said discharge head into said outlet conduit, a method of removing the pump from the tank comprising the steps of:
  disconnecting the suction and discharge connections below the liquid level in the tank without disconnection of any pipe couplings; and
  lifting the pump along a predetermined linear direction from the tank.

33. A method according to claim 28 wherein the step of disconnecting is carried out simultaneously with the lifting movement of the pump from the tank.

34. In a tank containing a liquid, a filter having a suction side, communicating means in communication with the suction side of the filter and a filtrate outlet conduit below the liquid level in said tank, and a pump for disposition in the tank below the liquid level therein and having an inlet port forming with said communicating means a suction connection, a discharge head forming with said outlet conduit a discharge connection, and an impeller for suctioning liquid from the tank through said filter, said communicating means and said pump inlet port for discharge through said discharge head into said outlet conduit, a method of disconnecting and removing the pump from the tank while the pump is below the liquid level in the tank consisting of the step of:
  lifting the pump along a predetermined linear direction from the tank.

35. In a tank containing a liquid, a filter having a suction side, communicating means in communication with the suction side of the filter and a filtrate outlet conduit below the liquid level in said tank, and a pump for disposition in the tank below the liquid level therein and having an inlet port forming with said communicating means a suction connection, a discharge head forming with said outlet conduit a discharge connection, and an impeller for suctioning liquid from the tank through said filter, said communicating means and said pump inlet port for discharge through said discharge head into said outlet conduit, a method of installing and connecting the pump in the tank and below the liquid level in the tank consisting of the step of:
  lowering the pump along a predetermined linear direction into the tank.

36. The method according to claim 35 in combination with a method of disconnecting and removing the pump from the tank while the pump is below the liquid level in the tank consisting of the step of:
  lifting the pump along the predetermined linear direction from the tank.

* * * * *

UNITED STATES PATENT AND TRADEMARK OFFICE
CERTIFICATE OF CORRECTION

PATENT NO. : 5,154,584

DATED : October 13, 1992

INVENTOR(S) : Stephen N. McEwen

It is certified that error appears in the above-identified patent and that said Letters Patent is hereby corrected as shown below:

Col. 8, line 41, after "readily" delete "an" and substitute therefor -- and --.

Col. 11, line 27, after "less" delete "tan" and insert therefor -- than --.

Col. 11, line 59, after "bearing" delete "," and insert therefor --.--.

Col. 12, line 59, delete "installor" and insert therefor -- install or --.

Col. 17, line 23, delete "arrangement" and insert therefor --arrangements--.

Claim 1, column 17, line 36, delete "discharge" after the word "pump".

Claim 2, column 17, line 51, delete "including" and insert therefor -- includes --.

Claim 13, column 18, line 67, after "means" delete "arrangement" and substitute therefor -- arranged --.

Claim 32, column 21, line 30, after "forming" insert -- with --.

UNITED STATES PATENT AND TRADEMARK OFFICE
CERTIFICATE OF CORRECTION

Page 2 of 2

PATENT NO. : 5,154,584
DATED : October 13, 1992
INVENTOR(S) : Stephen N. McEwen

It is certified that error appears in the above-indentified patent and that said Letters Patent is hereby corrected as shown below:

Col. 11, line 59, "the" should be -- The --.

Signed and Sealed this

Nineteenth Day of October, 1993

Attest:

BRUCE LEHMAN

Attesting Officer     Commissioner of Patents and Trademarks